Dec. 6, 1938.   F. H. SHEPARD, JR   2,139,474
INTEGRATION INDICATING CIRCUIT
Filed Dec. 23, 1936
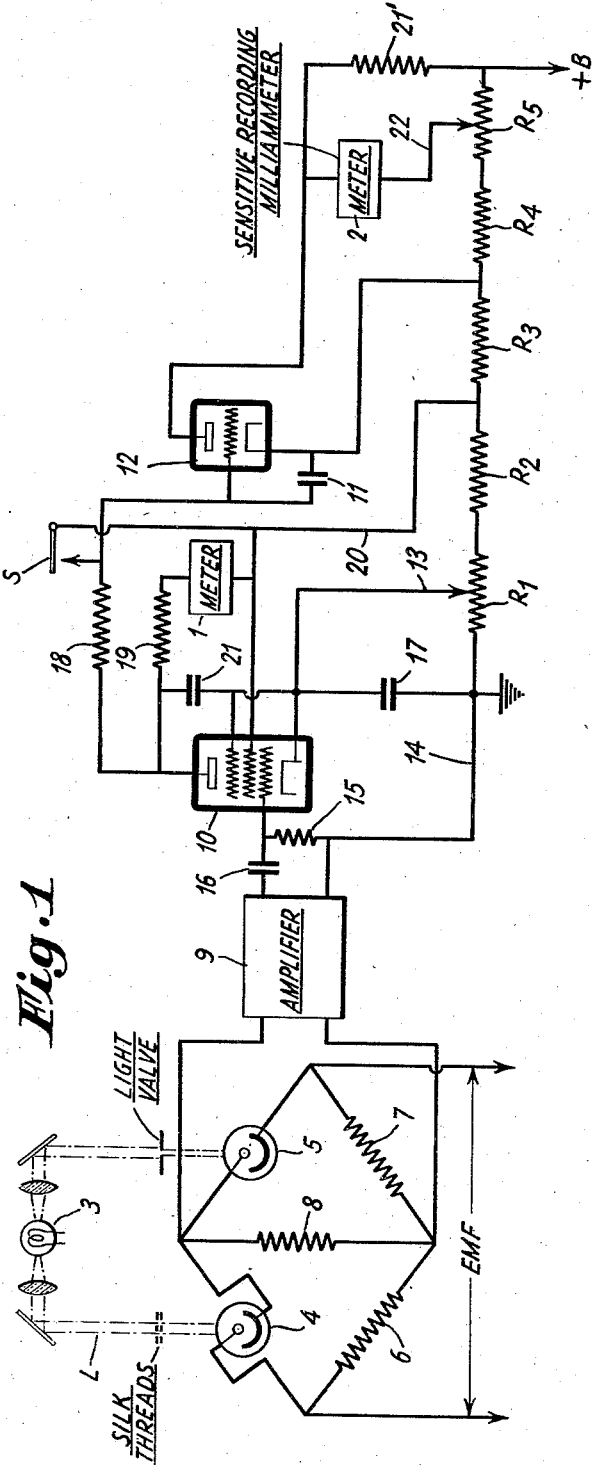
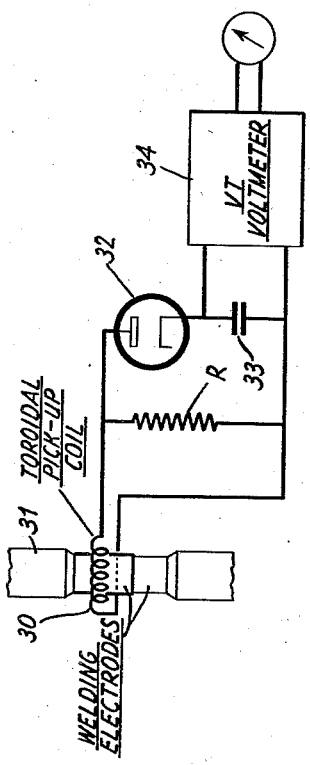
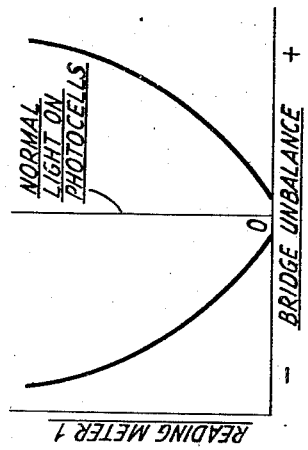
INVENTOR
FRANCIS H. SHEPARD JR.
BY H. G. Grover
ATTORNEY Patented Dec. 6, 1938

2,139,474

UNITED STATES PATENT OFFICE 2,139,474

INTEGRATION INDICATING CIRCUIT

Francis H. Shepard, Jr., Rutherford, N. J., assignor to Radio Corporation of America, a corporation of Delaware Application December 23, 1936, Serial No. 117,420

2 Claims. (Cl. 171—95)

My present invention relates to voltage indicating circuits, and more particularly to instantaneous indicating and integration indicating circuits having means for weighting input values according to their magnitudes.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several circuit organizations whereby my invention may be carried into effect.

In the drawing:

Fig. 1 is a circuit diagram of a silk thread evenometer embodying the invention, Fig. 2 shows the characteristic of the amplifier of Fig. 1 between the photo-tube bridge and the first meter, Fig. 3 is a schematic representation of the circuit of a welding monitor embodying a modification.

Referring now to the accompanying drawing, there is shown in Fig. 1 in schematic manner the circuit diagram of a so-called evenometer used in connection with silk threads. The present invention will be described in connection with such a device, although it need not be used therewith. Manufacturers of silk articles of wear, such as hosiery, desire to know as closely as possible the evenness of the silk thread. An evenometer indicates the deviations from normal diameter of silk thread. The transmission of light between spaced parallel threads is measured to determine such deviations. In Fig. 1, the spaced threads are schematically designated; actually the raw silk threads are wound around a seriplane board. The length of the latter is divided into panels. It is, also, equipped with a slot running from one end of the board to the other.

A beam of light L is directed through this slot, the beam coming from light source 3. The light rays passing between threads fall on the cathode of phototube 4; the output of the latter is proportional to the amount of incident light. The tube 4 is an arm of a bridge circuit; the latter including a second phototube 5, and resistors 6 and 7. The latter two are equal in value. Light from source 3 is applied to tube 5, and the bridge is brought to balance by adjusting the light valve until the same amount of light falls on the cathode of tube 5 as is passed through a transmission standard. The latter is replaced by the samples of silk threads when measurements are to be taken.

Variations in light transmitted to tube 4 caused by moving the light beam and phototube bridge at a constant speed along the slot from one end of the board to the other thereby scanning the silk threads, unbalance the bridge. This effects a voltage drop across resistor 8; the voltage being amplified by amplifier 9. The amplified voltage is impressed upon the input electrodes of tube 10, the latter being approximately a square law type amplifier of the 57 type. The output of amplifier 10 builds up a unidirectional voltage component across the plates of condenser 11 which component is proportional to the output current. Thus, condenser 11 acts as an integrator of the output of amplifier 10, and the value is taken off the condenser by the electron discharge tube 12, a triode of the 56 type. The output of the latter includes the meter 2, and the latter is a sensitive recording milliammeter. Generally, then, a series of bridge unbalances occurring during a time interval can be totaled and recorded.

Considering the circuit details of my invention more specifically, the alternating current output of the bridge is such that it is zero when balanced, and increases directly as the light on cell 4 is varied above or below the balance point.

The circuit is so designed that small values of unbalance will cause no indication, while larger values of unbalance in either direction will cause increasingly larger indications. Fig. 2 shows this characteristic. The steepness of the curves can be varied by changing the sensitivity of amplifier 10. The gap between the curves can be changed by varying the value of overbias on tube 10 by adjusting the position of tap 13 on the voltage supply bleeder resistor. The latter is connected across a +250 volt source, and comprises five resistor sections $R_1$ to $R_5$. The grounded side of resistor $R_1$ is connected by lead 14 to the low potential side of resistor 15; the condenser 16 connecting the grid of tube 10 to the output circuit of amplifier 9.

A condenser 17 is connected between the cathode of tube 10 and grounded lead 14. The plate of tube 10 is connected to the grid of tube 12 through a resistor 18; condenser 11 being connected between the grid and cathode of tube 12. The grid of the latter is connected to the junction of resistors $R_2$ and $R_3$ through a path including resistor 18, resistor 19, meter 1 and lead 20. The screen grid, or second grid, of tube 10 is connected to lead 20; while the third grid is at cathode potential thereby acting as a suppressor grid. The condenser 21 is connected between the latter and the plate side of resistor 19. The cathode of tube 12 is connected to the junction of resistors R₃ and R₄. The switch S has its adjustable member connected to lead 20, and its contact element is connected to the grid side of condenser 11. The switch S is in shunt with condenser 11, and when closed acts to short circuit the latter.

The meter 2 is connected in shunt with resistor 21', the latter being connected between the plate of tube 12 and the +B side of resistor R₅. When the alternating current output from the grid amplifier 9 is zero, the input grid of tube 10 is normally biased so that its plate current is zero. It follows, therefore, that when meter 1 reads zero, the drop across the plate resistor 19 is zero; and the bias voltage applied to the grid of tube 12 through resistor 18 is equal to the voltage drop in the resistor section R₃. This is the normal bias of tube 12, and is obtained under all conditions when switch S is closed. Thus, when the alternating current is zero there is no tendency for the grid of tube 12 to depart from its normal bias. That is the current in resistor 18 tends to remain zero.

If alternating current is applied from the bridge amplifier 9, current will flow in the plate circuit of tube 10; meter 1 will indicate, and there will be a potential drop across resistor 19. This latter potential is applied to condenser 11 and the grid of tube 12 through resistor 18. The instantaneous current through resistor 18, assuming the time constant of resistor 18 and condenser 11 to be many times the time under consideration, is proportional to the voltage drop across the load resistor 19 of tube 10. If the time constant of resistor 18 and condenser 11 is large with respect to the time under consideration, the voltage built up across condenser 11 will be small with respect to the voltage drop in the plate resistor 19. The charge accumulated by condenser 11 during a short period of time will be approximately directly proportional to the voltage drop in resistor 19 multiplied by the elapsed time. If the voltage drop across resistor 19 varies over the elapsed time, then the charge of condenser 11 will be proportional to the integrated value of the voltage drop across resistor 19 multiplied by the interval of time.

It, therefore, follows that if meter 2 is read at definite intervals after opening switch S, these readings may be taken as a measure of the average voltage drop across resistor 19. Since the latter is a function of the bridge unbalance, the reading of meter 2 may be taken as a measure of average bridge unbalance weighted according to the response characteristics obtained in tube 10 as shown in Fig. 2. The tap 22 may be adjusted to make the meter 2 normally read zero, or any other desired value. In this way the average diameter size of the silk threads is determined. Before scanning each group of samples the switch S discharges condenser 11, and clears it so that a new series of additions may be made. The bridge being balanced on the average diameter size transmits no normal output, but adds up as a measure of unevenness as long as the silk does not remain of average size. Where the skein starts to deviate, or an entire skein deviates and becomes coarser or finer than average, the bridge immediately becomes unbalanced by an amount equal to the extent of deviation. The output of the bridge, the deviation current, is then squared and added up so that the meter 2 records the average squared deviation. The tube 10 may have its constants chosen to have a linear law characteristic, or any other desired characteristic.

The following list of circuit constants is given merely by way of specific illustration, and is not to be considered in any way restrictive:

| | | |
|---|---|---|
| R₁ = | ohms | 1000 |
| R₂ = | do | 6500 |
| R₃ = | do | 100 |
| R₄ = | do | 4000 |
| R₅ = | do | 2000 |
| Resistor 21' = | do | 5000 |
| Resistor 19 = | do | 100,000 |
| Resistor 18 = | megohms | 20 |
| Resistor 15 = | do | 2 |
| Condenser 16 = | microfarad | 1 |
| Condenser 21 = | do | 2 |
| Condenser 11 = | do | 4 |

In Fig. 3 there is shown a welding monitor circuit which embodies the integrator condenser network employed in the circuit of Fig. 1. In the manufacture of metal tubes, where currents of the order of 75,000 amperes are used, the welding machines must be adjusted so that the total heat energy developed in the weld during the welding cycle has the correct value. This quantity is measured by the circuit of Fig. 3. An air-cored toroidal coil 30 is slipped over one of the welding electrodes 31 where it has induced therein a voltage from the field of the welding current. Because the welding current is a train of approximate sine waves, the coil voltage is sinusoidal and is proportional to the welding current.

A small part of the open circuit coil voltage, about 0.1 volt, is applied to a diode 32 in series with a condenser 33. Since the diode characteristic for this small voltage has the form of the square law, the current flowing into the condenser is proportional to the square of the coil voltage, and is proportional to the square of the welding current. Of course, the device 32 may have any other characteristic. The condenser 33 stores up the charge flowing into it, and thus builds up a voltage which is closely proportional to the diode current integrated over the welding period. The condenser voltage is not large enough to disturb appreciably the proportionality of the diode current to the square of the coil voltage. Hence, the voltage attained by the condenser 33 is proportional to the square of the instantaneous value of the welding current integrated over the duration of time of the welding period. This integral can be taken as a measure of the total heat energy of the weld, if it is assumed that the resistance of the weld always varies in the same manner during the welding period.

On the basis of this assumption, which is approximately correct, the condenser voltage is read on a vacuum tube voltmeter 34 as a measure of the total welding heat. This measurement is particularly helpful when a welding machine is first being put into operation. There are two adjustments to be made on the machine, one controlling the peak amperage of the welding current and the other the duration of the welding current. These adjustments are made so that the total heat energy of the machine's weld has the same value as that of other machines turning out satisfactory work.

While I have indicated and described several systems for carrying my invention into effect, it will be apparent to one skilled in the art that my invention is by no means limited to the particular arrangements shown and described, but that many modifications may be made without departing from the scope of my invention, as set forth in the appended claims.

What I claim is:

1. In an integration indicating circuit for an electrical current flowing for a predetermined period of time, an electron discharge tube having a substantially square law characteristic, means impressing said current upon the tube input electrodes, a condenser in circuit in the space current path of the tube and adapted to be charged up by the output current of said tube, and means, responsive to the instantaneous magnitude of the potential across the condenser, for indicating the sum of the squares of the said current amplitude over said period, said tube including a meter in its plate circuit, and said indicating means comprising a second tube having its input electrodes connected across the condenser.

2. In an apparatus for measuring the sum of the squares of a current amplitude integrated over a predetermined time interval, an electron discharge device which has a square law characteristic relating input and output current, means impressing said current upon said device, a condenser connected to the output circuit of said device whereby the condenser is charged with the output current of said device, and means for translating the instantaneous potential value across the condenser into an indication of said sum.

FRANCIS H. SHEPARD, Jr.